US008966151B2

(12) United States Patent
Zitlaw

(10) Patent No.: US 8,966,151 B2
(45) Date of Patent: Feb. 24, 2015

(54) APPARATUS AND METHOD FOR A REDUCED PIN COUNT (RPC) MEMORY BUS INTERFACE INCLUDING A READ DATA STROBE SIGNAL

(75) Inventor: Clifford Alan Zitlaw, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 383 days.

(21) Appl. No.: 13/435,445

(22) Filed: Mar. 30, 2012

(65) Prior Publication Data
US 2013/0262907 A1 Oct. 3, 2013

(51) Int. Cl.
*G06F 1/08* (2006.01)
*G06F 1/10* (2006.01)

(52) U.S. Cl.
CPC ... *G06F 1/10* (2013.01); *G06F 1/08* (2013.01)
USPC .............................. 710/305; 710/35; 713/501

(58) Field of Classification Search
CPC ...................................................... G06F 1/08
USPC ............... 710/35, 305; 711/167; 365/233.13, 365/233.18; 713/501
See application file for complete search history.

(56) References Cited

U.S. PATENT DOCUMENTS

| 2005/0185480 A1* | 8/2005 | Mukker et al. ................. 365/198 |
| 2008/0059667 A1* | 3/2008 | Berenbaum et al. ........... 710/110 |
| 2013/0058174 A1* | 3/2013 | Lin et al. ......................... 365/193 |

FOREIGN PATENT DOCUMENTS

| GB | 2337618 A * 11/1999 ............... G11C 7/00 |
| WO | WO 2007125519 A2 * 11/2007 ............... G11C 7/10 |

* cited by examiner

*Primary Examiner* — Glenn A Auve

(57) ABSTRACT

A method and apparatus for a memory bus interface including a read data strobe. The interface includes a chip select for delivering a chip select signal that indicates when a peripheral device is activated, wherein said bus interface provides communication between a host device and said peripheral device. The interface also includes a differential clock pair for delivering a differential clock signal. A read data strobe is included in the interface for delivering a read data strobe signal from the peripheral device. The interface includes a data bus for delivering command, address, and data information. The read data strobe indicates when valid data is present on the data bus.

18 Claims, 11 Drawing Sheets

| CA Bit# | Bit Name | Bit Function |
|---|---|---|
| 47 | R/W# | Identifies the transaction as a Read or Write. R/W#=1 indicates a Read operation and R/W#=0 indicates a Write operation. Target space is defined in CA46. |
| 46 | Target | Indicates whether the Read or Write operation accesses the memory or register spaces. Target=0 indicates memory space, Target=1 indicates the register space. |
| 45-37 (1Gb)<br>45-36 (512Mb)<br>45-35 (256Mb) | Reserved | Reserved for future row address expansion. |
| 37-16 (1Gb)<br>36-16 (512Mb)<br>35-16 (256Mb) | Row Address | Row component of target address. |
| 15 | Burst Type | Indicates whether the burst will be continuous or wrapped. Burst type=0 indicates Wrapped Burst, Burst type=1 indicates Continuous Burst. |
| 14-13 | Reserved | Reserved for Byte Enables used for LPC RAM devices (don't care for Flash). Byte Enable=01 indicates that bits 8-15 are masked, Byte Enable=10 indicates that bits 7-0 are masked. These bits should be driven by the host to 11 for the LPC Flash device. |
| 12-4 | Reserved | Reserved for future column address expansion. |
| 3-0 | Column Address | Column component of the target address. The LPC Flash has a 16 word (32B) page, only bits 3-0 are used |

APPARATUS AND METHOD FOR A REDUCED PIN COUNT (RPC) MEMORY BUS INTERFACE INCLUDING A READ DATA STROBE SIGNAL

TECHNICAL FIELD

The invention generally relates to communication buses.

BACKGROUND OF THE INVENTION

Most microcontroller and microprocessor devices include bus interfaces to communicate with off-chip peripheral devices. These bus interfaces support a wide assortment of products including memories, analog to digital converters, digital to analog converters, liquid crystal display (LCD) controllers and a myriad of other peripheral devices.

There are a number of different peripheral bus interfaces that have unique characteristics targeting specific categories of peripheral devices. The available bus interfaces in the prior art try to balance bus performance with implementation cost. Host microcontroller implementation cost covers a number of characteristics including interface signal count, the physical characteristics of the I/O drivers and complexity of the bus controller integrated into the microcontroller.

There is often a balancing act between the number of pins required and the level of performance provided by the peripheral bus. More specifically, bus interfaces typically focus on either minimizing pin count or maximizing data throughput. On the one hand, higher latency busses are often implemented with fewer bus signals to minimize system level hardware overhead. For instance, serial peripheral bus interfaces typically are designed with low pin counts, but have slower data rates. As an example, the I2C bus is a low speed interface that requires only two pins to support communication between the host device and a peripheral device. On the other hand, low-latency and high-throughput peripheral busses typically require a large number of signals to support the interface between a host microcontroller and peripheral device. For instance, parallel peripheral bus interfaces are designed for high speed data transmission rates. As an example, Dynamic Random Access Memory (DRAM) bus interfaces are used to provide high data throughput to off-chip DRAM memory devices.

SUMMARY OF THE INVENTION

Accordingly, embodiments of the present invention provide for a memory bus interface that balances between bus performance and the required number of bus signals. In one embodiment, an apparatus for a memory bus interface is described that includes a read data strobe. The interface includes a chip select for delivering a chip select signal that indicates when a peripheral device is activated, wherein the bus interface provides communication between a host device and the peripheral device. The interface also includes a differential clock pair for delivering a differential clock signal. A read data strobe is included in the interface for delivering a read data strobe signal from the peripheral device. The interface includes a data bus for delivering command, address, and data information. The read data strobe indicates when valid data is being output by a peripheral device onto the data bus.

In another embodiment, a method is disclosed for performing transactions using a memory bus interface including a read data strobe that indicates when valid data is present. The bus interface provides communication between a host device and a peripheral device. The method includes configuring a chip select to facilitate delivery of a chip select signal, wherein the chip select signal indicates when a peripheral device is activated. The method further includes configuring a differential clock pair for delivering a first clock signal and a second clock signal to enable a differential clock signal. The method further includes configuring a read data strobe for delivering a source synchronous output clock as a read data strobe signal from the peripheral device. A data bus is also configured for delivering command, address, and data information. The pair of differential clocks and the read data strobe enable transfer of data in a Double Data Rate (DDR) manner for a read transaction and a write transaction.

In still another embodiment, a method is disclosed for performing a read transaction using a memory bus interface that provides communication between a host device and a peripheral device. The bus interface includes a differential clock signal pair and a read data strobe signal that indicates when valid data is present. The differential clock signal and the read data strobe enables transfer of data on a data bus in a DDR manner for read transactions. More specifically, the method for performing a read transaction on the memory bus includes initiating at the host device a read transaction by asserting the chip select signal (e.g., to LOW) while the first and second clock signals are complementary (e.g., first clock signal is LOW and the second clock signal is HIGH). Also, the method includes sending from the host device to the peripheral device a read command and a target address over three clock cycles in the differential clock signal over the data bus. The method also includes receiving data at the host device from the peripheral device over the data bus, and receiving at the host device over the read data strobe interface a read data strobe signal originating at the peripheral device. The method further includes retrieving at the host device the data beginning with a leading edge of the read data strobe signal, wherein the read data strobe signal comprises a source synchronous output clock.

In still another embodiment, a method is disclosed for performing a write transaction using a memory bus interface that provides communication between a host device and a peripheral device. The bus interface includes a clock signal pair providing a differential clock signal and a read data strobe signal that indicates when valid data is present. The differential clock signal and the read data strobe enables transfer of data on a data bus in a DDR manner for read transactions. More specifically, the method for performing a write transaction on the memory bus includes indicating at the host device a beginning of the write transaction by transitioning the chip select to LOW while the first clock signal is LOW and the second clock signal is HIGH. The method also includes sending a write command and a target address over three clock cycles in the differential clock signal over the data bus. The method includes sending data from the host device over the data bus.

BRIEF DESCRIPTION OF THE DRAWINGS

The present invention is illustrated by way of example, and not by way of limitation, in the figures of the accompanying drawings and in which like reference numerals refer to similar elements.

FIG. 7 is a table indicating bit functionalities for a bus transaction over a memory bus interface that includes a read data strobe that indicates when valid data is present, in accordance with one embodiment of the present disclosure.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention. For instance, in order to avoid obscuring the present invention, some well-known system configurations and process steps are not disclosed in detail. Likewise, the drawings showing embodiments of the invention are semi-diagrammatic and not drawn to scale, and particularly, some of the dimensions are for the clarity of presentation and are shown exaggerated in the Figures.

Accordingly, embodiments of the present invention provide for apparatus and methods that provide a unique balance between bus performance and the required number of bus signals. Other embodiments of the present invention provide the above advantage and also provide for implementing reduced pin count memory bus interfaces that exhibit lower initial latencies and higher sustained throughputs. Still other embodiments of the present invention provide the above advantages and also provide for the implementation of a variable latency scheme over a memory bus interface that implements the use of a data strobe signal to indicate when valid data is delivered over the bus, thereby eliminating the need for dedicated "READY" or "WAIT" signals heretofore associated with existing variable latency bus protocols when delivering information over the data bus.

Figure 1:
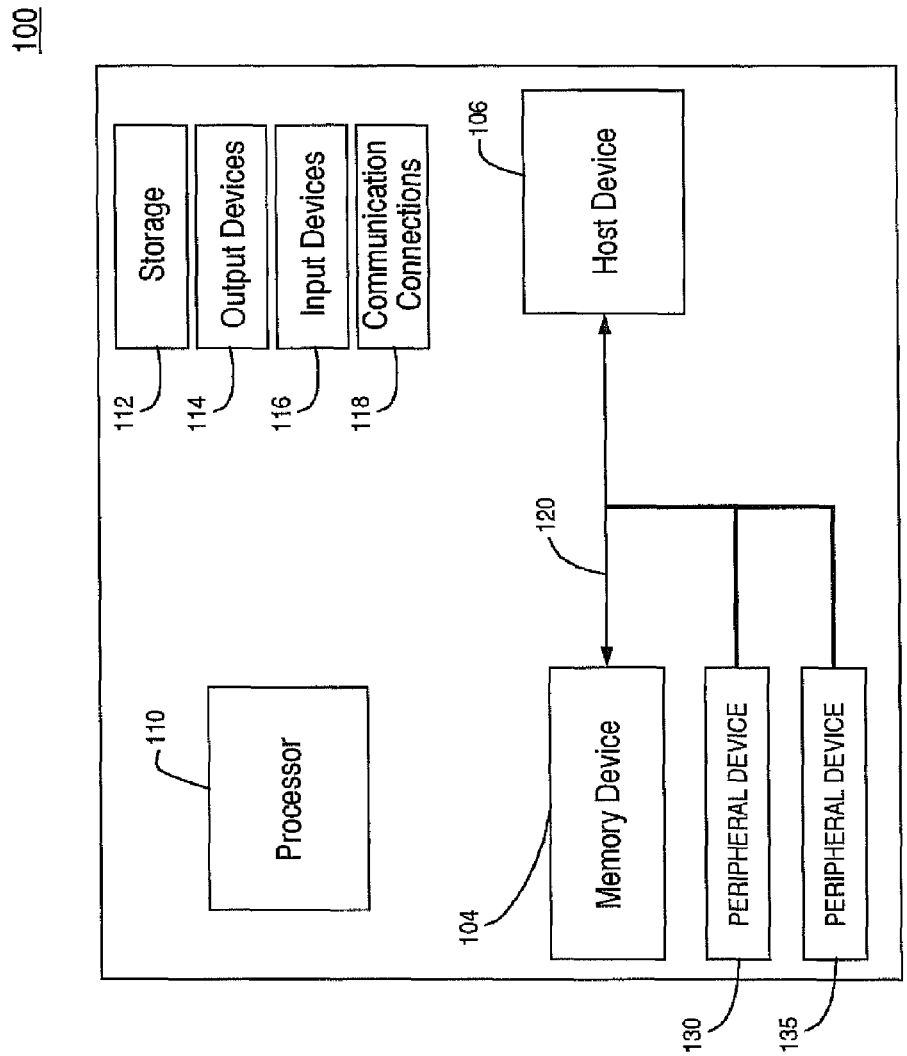
FIG. 1 is a block diagram of a computing system, upon which embodiments of the presently claimed subject matter can be implemented.

FIG. 1 is a block diagram of a computing system 100, upon which embodiments of the present claimed subject matter can be implemented. As an example, computing system 100 may comprise a system on a chip (SOC), such as a memory SOC for providing memory. Although computing system 100 is shown and described in FIG. 1 as having certain numbers and types of elements, the embodiments are not necessarily limited to the exemplary implementation. That is, computing system 100 can include elements other than those shown, and can include more than one of the elements that are shown. For example, computing system 100 can include a greater number of processing units than the one processor 110 shown. Similarly, in another example, computing system 100 can include additional components not shown in FIG. 1.

In its most basic configuration, computing system 100 typically includes at least one processor 110 and a memory device 104. Depending on the exact configuration and type of computing device, memory device 104 may be volatile (such as RAM), non-volatile (such as ROM, flash memory, etc.) or some combination of the two. In one embodiment, memory device 104 comprises a NOR Flash memory array. The computing system 100 may also include additional storage 112 (removable and/or non-removable) including, but not limited to magnetic or optical disks or tape. Storage media includes volatile and non-volatile storage, removable and non-removable storage implemented in any method or technology for storage of information such as computer readable instructions, data structures, program modules or other data. By way of example, and not limitation, storage media includes RAM, ROM, EEPROM, flash memory or other memory technology, CD-ROM, digital video disks (DVD) or other optical storage, magnetic cassettes, magnetic tape, magnetic disk storage or other magnetic storage devices, or any other medium which can be used to store the desired information and which can accessed by computing system 100.

Additionally, computing system 100 may include a host device 106 coupled to the memory device 104 via a memory bus interface 120, the bus facilitating transactions between the host device 106 and memory device 104 and one or more peripheral devices, such as, peripheral devices 130 and 135. As discussed below, the memory device interface 120 allows for the delivery of data using a read data strobe to indicate when valid data is available on a bus.

The computing system 100 may also include communication connection(s) 118 that allow the computing system 100 to communicate with other systems. Communication connection(s) 118 is an example of a communication media. By way of example, and not limitation, communication media includes wired media such as a wired network or direct-wired connection, and wireless media such as acoustic, RF, infrared and other wireless media.

The computing system 100 may include input device(s) 116 such as a keyboard, mouse, pen, voice input device, game input device (e.g., a joy stick, a game control pad, and/or other types of game input device), touch input device, etc. Additionally, the computing system 100 may also include output device(s) 114 such as a display (e.g., a computer monitor and/or a projection system), speakers, printer, network peripherals, etc.

Figure 2A:
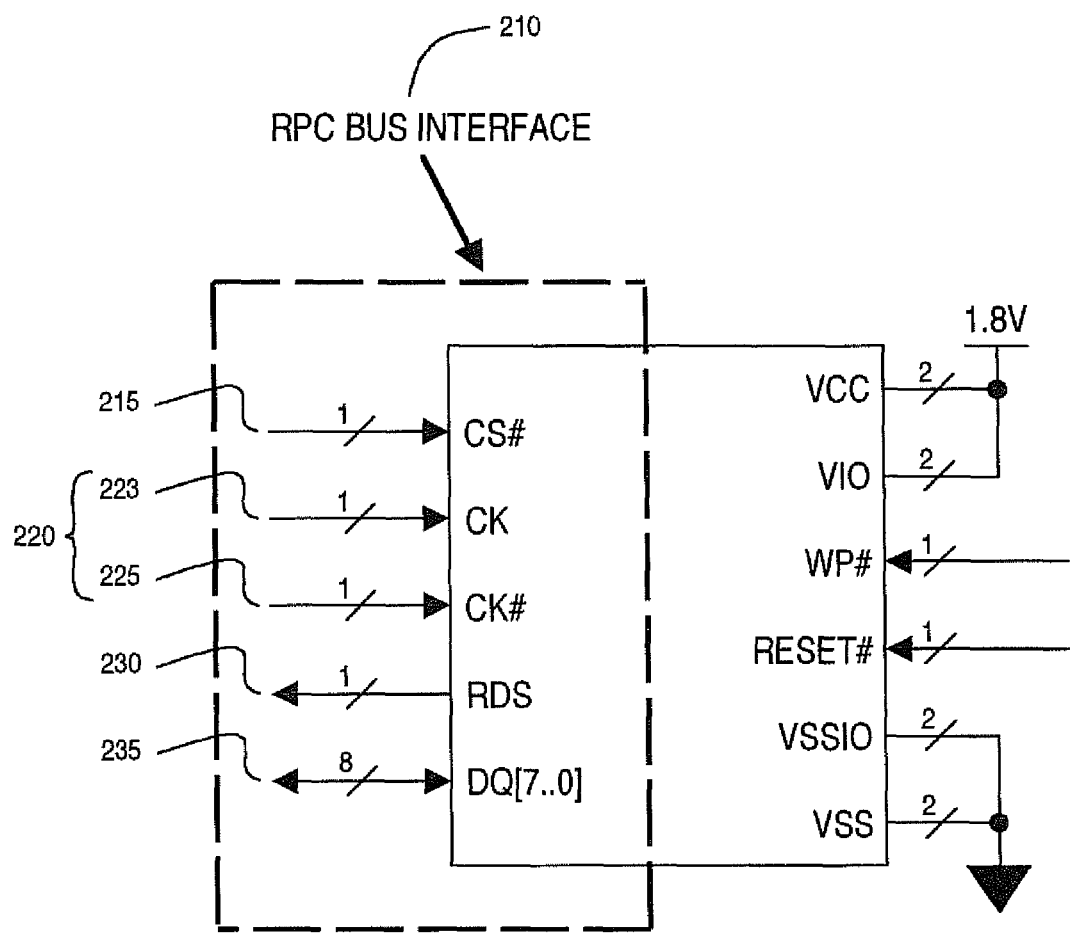
FIG. 2A is a diagram of a reduced pin count interface including a read data strobe that indicates when valid data is present, in accordance with one embodiment of the present disclosure.

FIG. 2A is a diagram 200 of a reduced pin count (RPC) memory bus interface 210 including a read data strobe 230 that indicates when valid data is present, in accordance with one embodiment of the present disclosure. For context, the bus interface 210 of FIG. 2 provides similar functionality as bus 120 of FIG. 1, and acts to facilitate communication between a host device and a peripheral device, such as, host device 106 and peripheral device 130 or 135 and/or memory device 104 of a computing system 100, as shown in FIG. 1. In one embodiment, the RPC memory bus interface comprises a parallel interface. In another embodiment, the RPC memory bus interface comprises a serial bus interface.

In particular, RPC memory bus interface 210 includes a chip select line 215 that is configured for delivering a chip select (CS#) signal. The CS# signal comprises a device enable signal that is used to identify when a corresponding peripheral device is activated for a given transaction. For instance, the chip select 215 is configured for delivering the CS# signal that indicates when a peripheral device is activated. More specifically, the CS# signal is enabled to notify the peripheral device that a read or write transaction or transaction is requested.

Additionally, the RPC interface 210 includes a differential clock pair of lines 220 that comprises a first clock line 223 and a second clock line 225. More specifically, the differential clock pair 220 is configured for delivering a differential reference clock signal comprising two clock sources. That is, the differential clock signal is based on and comprises a first clock (CK) signal delivered over the first clock line 223, and a second clock (CK#) signal delivered over the second clock line 225. The differential clock, comprising the CK and CK# signals, is used to identify when to capture command specific, address, and data information over the bus interface 210. In other embodiments, the functionality of the clock feature is single ended or differential.

The RPC interface 210 also includes a read data strobe line 230. The read data strobe line 230 is configured to optionally deliver a read data strobe (RDS) signal from the peripheral device, in one embodiment. The RDS signal comprises a source synchronous output clock, in one embodiment. Further, the RDS signal is used by the peripheral device to indicate when read data is valid on the data bus 235. In embodiments, the functionality of the RDS signaling is single ended, differential, or not present at all.

In addition, the RPC interface 210 includes a data bus 235. The data bus 235 is configured to deliver command specific identifiers, address information, and data information, as will be further described in relation to FIG. 7. In one embodiment, the data bus 235 is configured as an 8 line wide data bus capable of delivering a byte (e.g., 8 bits) of data on every edge of the differential clock signal. As such, the RPC memory bus interface 210 provides low initial latencies and high sustained throughputs over a minimal, 12 line active signal bus interface.

In one embodiment, the use of the differential clock, comprising the CK and CK# signals, and the RDS signal allows data to be transferred in a Double Data Rate (DDR) fashion, wherein data is transmitted twice per a normal clock cycle, in one embodiment. More specifically, the differential clock and the RDS signal enable the transfer of transaction and command specific identifiers, address information, and data information in DDR fashion over the data bus 235. In still other embodiments, instead of both clock CK and CK# signals, only one clock signal is used for delivering data in a single data rate fashion.

As shown in FIG. 2A, additional lines and/or pins are available for additional signals. For instance, one or more power lines and/or pins are provided for delivering power to the computing system (e.g., system 100 of FIG. 1) and/or chip, such as, a memory chip. Power lines and/or pins include one or more Vcc lines for distributing a system wide power, and one or more VIO lines for distributing a second power to input/output components on the chip. In addition, a write protect line is configured to deliver a write protect (WP#) signal disabling the write functionality in the memory. Also, a reset line or pin is configured to deliver a reset (RESET#) signal to initialize and place the chip back to a reset or initial state. Also, one or more ground lines and/or pins are provided for delivering ground to the computing system (e.g., system 100 of FIG. 1) and/or memory chip. For instance, one or more VSSIO ground lines distribute a ground to the input/output components on the system or chip. Also, one or more VSS ground lines distribute a system wide ground to the system or chip.

Figure 2B:
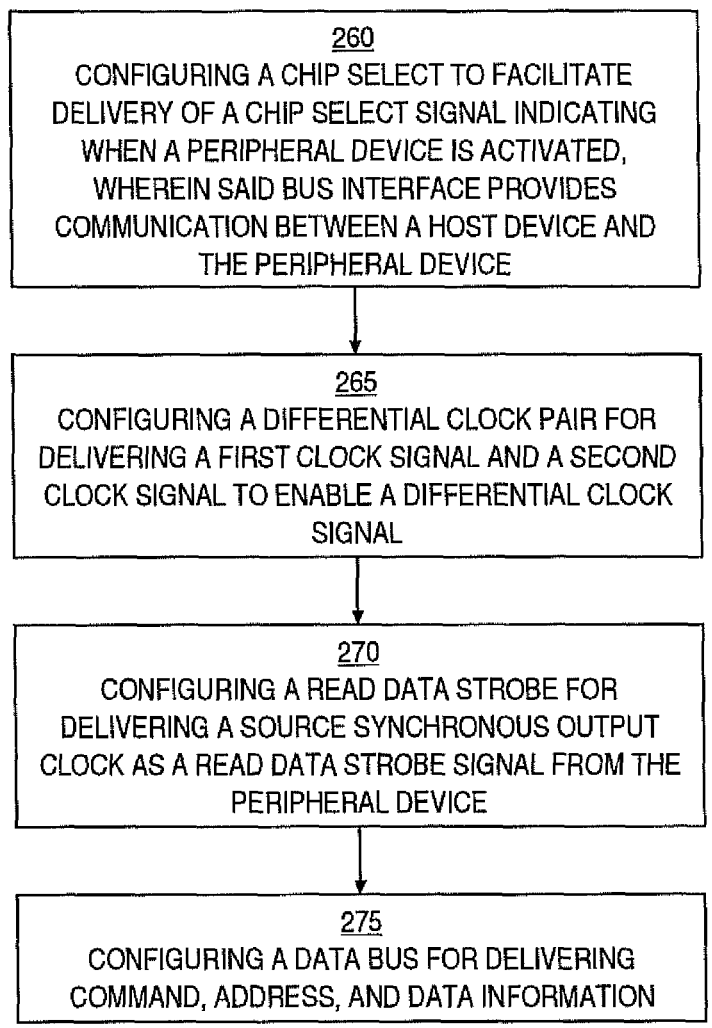
FIG. 2B is a flow diagram illustrating a method for performing transactions using a memory bus interface including a read data strobe that indicates when valid data is present, in accordance with one embodiment of the present disclosure.

FIG. 2B is a flow diagram 200B illustrating a method for performing transactions using a memory bus interface including a read data strobe that indicates when valid data is present, in accordance with one embodiment of the present disclosure. In one embodiment, the transactions performed in flow diagram 200B are performed on the RPC bus interface 210 of FIG. 2A to provide for low initial latencies and high, sustained throughput when facilitating communication between a host device and a peripheral device and/or memory device on a system or chip.

At 260, the RPC interface is configured to include a chip select line, wherein the line is configured to facilitate delivery of a chip select (CS#) signal. As will be further described below in relation to FIGS. 4B, 4C, and 5B, the CS# signal indicates when a peripheral device is activated for a given transaction, such as, a read or write transaction.

At 265, the RPC interface is configured to include a pair of clock lines, wherein the clock lines are configured to deliver a first clock signal and a second clock signal to enable a differential clock signal. As such, the pair of clock lines is configured to deliver a differential reference clock that is used to identify when to capture command specific, address, and data information over a bus interface.

At 270, the RPC interface is configured to include a read data strobe line, wherein the read data strobe line is configured to deliver a source synchronous output clock as a read data strobe (RDS) signal from a peripheral device. The RDS signal is used by the peripheral device to indicate when read data is valid on the data bus. In addition, in another embodiment, the RDS signal is bi-directional and is used by the host device to indicate when write data is valid on the data bus. As previously described, the differential clock pair of signals and the RDS signal allows data to be transferred in a DDR fashion over a data bus.

At 275, the RPC interface is configured to include a data bus, wherein the data bus is configured to deliver command specific identifiers, address, and data information. For instance the command identifiers indicate whether the current transaction is a read transaction or a write transaction. In one embodiment, the data bus is configured as an 8 line wide data bus capable of delivering 8 bits of data a time.

Figure 3A:
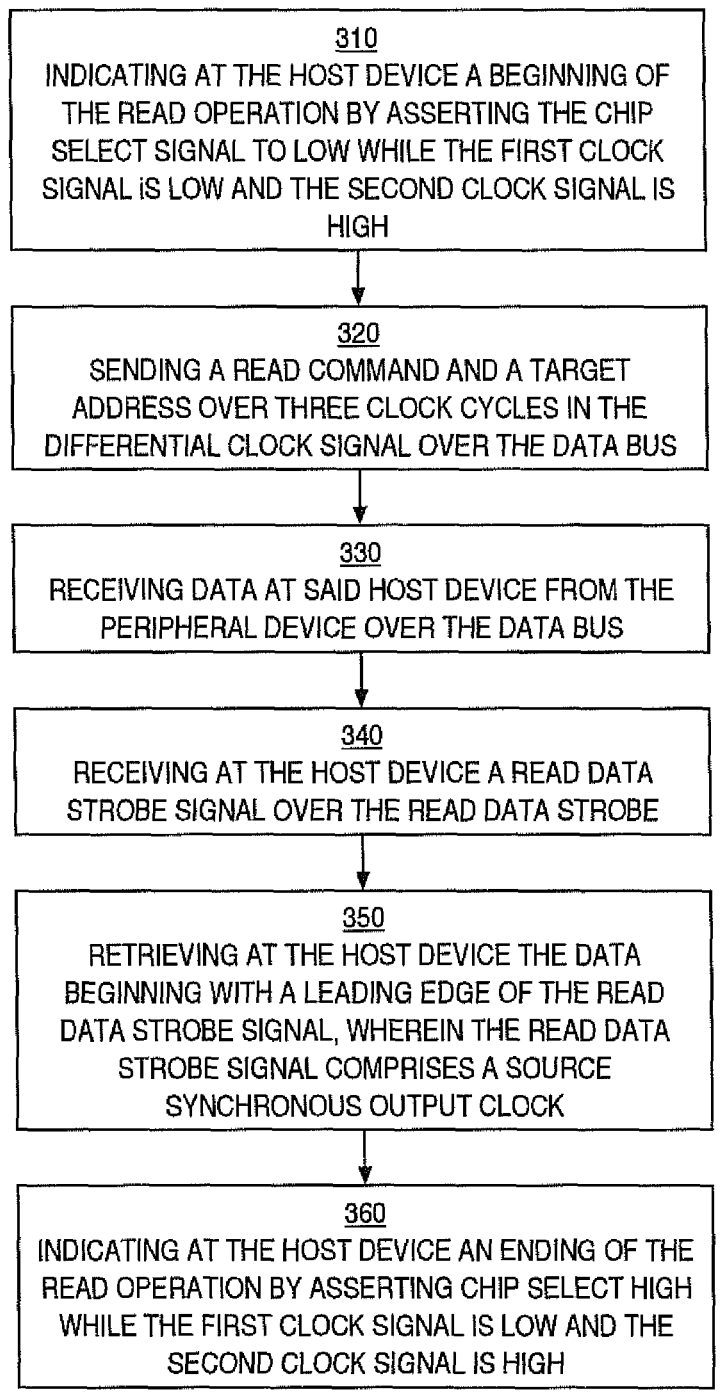
FIG. 3A is a flow diagram illustrating a method for performing a read transaction using a memory bus interface including a read data strobe that indicates when valid data is present, in accordance with one embodiment of the present disclosure.
Figure 3B:
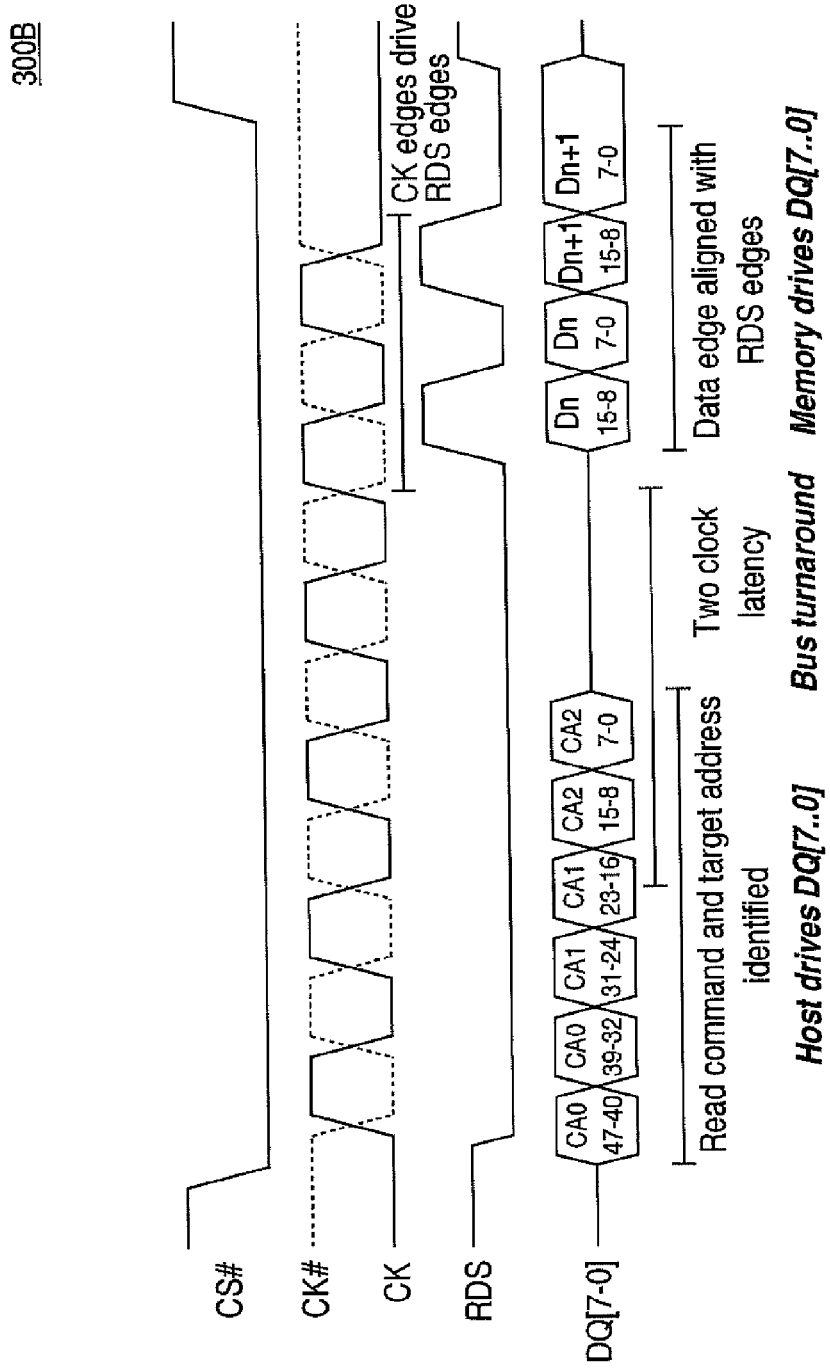
FIG. 3B is a timing diagram illustrating a read transaction over a memory bus interface that includes a read data strobe that indicates when valid data is present, in accordance with one embodiment of the present disclosure.

FIGS. 3A and 3B in combination illustrate a method for performing a read transaction using an RPC memory bus interface, such as the interface 210 of FIG. 2A. In particular, FIG. 3A is a flow diagram 300A illustrating a method for performing a read transaction using a memory bus interface that facilitates communication between a host device and a memory device. FIG. 3B is a timing diagram 300B illustrating the implementation of the read transaction outlined in FIG. 3A, over the RPC memory bus interface, in accordance with one embodiment of the present disclosure. That is, the timing diagram 300B illustrates the bus signaling protocol used for a read transaction. More particularly, the RPC memory bus interface includes a read data strobe that indicates when valid data is present on the data bus. Also, the use of a differential clock and the data strobe signal allows command, address, and data information to be transferred in a DDR fashion at higher clock rates.

In one embodiment, the transactions performed in flow diagram 300A, and outlined in the timing diagram 300B, are performed on the RPC bus interface 210 of FIG. 2A to provide for low initial latencies and high, sustained throughput when facilitating communication between a host device and a peripheral device and/or memory device on a system or chip. That is, the transactions performed in flow diagram 300A illustrate the implementation of a read transaction between a host device and a memory device acting as a peripheral device on a computing system.

At 310, at a host device, a read transaction is initiated by the host device by the assertion of the chip select (CS#) signal (e.g., HIGH or LOW) of the RPC interface and the delivery of command and address information over the data bus, while the clock signals have opposing voltages (e.g., HIGH and LOW). For illustration, as shown in timing diagram 300B, at the beginning of a read transaction, where the read request is delivered from the host device to the memory device, the chip select (CS#) signal is asserted to LOW, while the first clock signal (CK) is asserted LOW, and the second clock signal (CK#) is HIGH. Also, throughout the duration of a read transaction, the chip select (CS#) signal is asserted LOW, in one embodiment.

At 320, read command and target address information are delivered from the host device over the data bus upon the first six clock transitions (e.g., three clock cycles). That is, six clock edges are used by the host to indicate to the peripheral memory device the transaction characteristics. In embodiments, one or more command and address (CAx) bits are delivered from the host device to the peripheral memory device to indicate the transaction characteristics, and may require one or more clock transitions to indicate transaction characteristics. For illustration, as shown in timing diagram 300B, 48 CAx bits are presented in one embodiment during the initial portion of the read transaction over the RPC bus interface, as will be further described in relation to FIG. 7. In particular, the transaction is identified with six byte wide values that are transferred from the host device to the peripheral device on the DQ[7-0] data bus in a DDR fashion during the first six clock edges. These CAx bits indicate that the current transaction is a read transaction, such that the receiving peripheral memory device understands that the current transaction is a read request. In addition, the information includes the target address in memory from which data is to be retrieved and delivered by the peripheral memory device back to the host device. As such, the peripheral device accesses the requested data from memory and sends the requested data back to the host device over the data bus DQ[7-0] of the RPC interface.

Figure 3C:
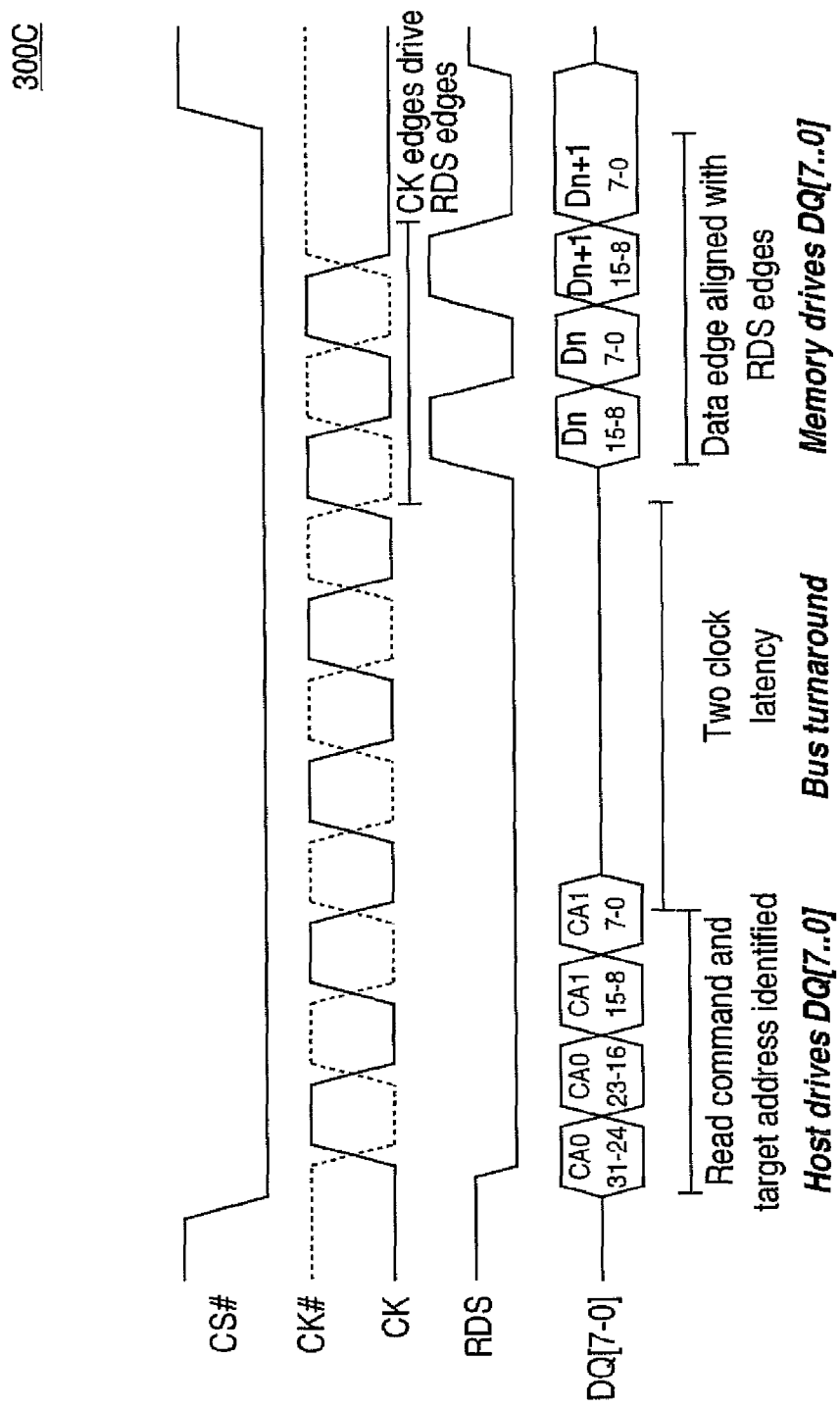
FIG. 3C is another timing diagram illustrating a read transaction over a memory bus interface that requires fewer bits to deliver command and address information over the RPC memory interface bus, when compared to the timing diagram of FIG. 3B, in accordance with one embodiment of the present disclosure.

In FIG. 3C, a timing diagram 300C shows a read transaction over an RPC memory bus interface illustrating the variation in the number of command and address bits necessary to indicate transaction characteristics, in accordance with one embodiment of the present disclosure. The timing diagram 300C includes a read data strobe (RDS) indicating when valid data is present, in accordance with one embodiment of the present disclosure. As shown, timing diagram 300C includes fewer command and address bits than that included in timing diagram 300B of FIG. 3B. That is, address bits are delivered over 4 clock edges in timing diagram 300C, wherein six clock edges are required in timing diagram 300B to deliver the necessary command and address bits. Specifically, the targeted peripheral memory device associated with the timing diagram 300C may be a lower density device that requires fewer address bits, as compared to the memory device associated with timing diagram 300B. As such, the lower density device in turn requires fewer clock edges and/or cycles to define command and address location information.

At 330, the data is delivered by the peripheral memory device and received at the host device over the data bus. As shown in timing diagram 300B, the data (Dn . . . ) is output by the peripheral memory device.

In addition, at 340, a read data strobe (RDS) signal is delivered by the peripheral memory device and received by the host device. In one embodiment, the RDS signal comprises a source synchronous output clock. The RDS signal is used to indicate when the requested data is valid and available on the data bus. More particularly, at 350, data is retrieved by the host device as indicated by the RDS signal. Data is retrieved by the host device with the use of an edge aligned RDS signal. In one embodiment, data is retrieved beginning with a leading edge of the RDS signal, as is shown in the timing diagram 300B.

As shown in FIG. 3B, a latency is considered before the requested data is returned, in one embodiment. The latency is required (e.g., one or more dummy clock cycles) to enable the peripheral memory device to retrieve the data from the target address of the memory array and move the data to the output buffers of the peripheral device in preparation of delivery to the host device over the data bus. In embodiments, the latency period is determined by the peripheral device. After the latency period, requested data is delivered over the data bus by the peripheral device to the host device and the read data strobe (RDS) signal is asserted (e.g., HIGH or LOW) to indicate valid data. In one embodiment, the latency is a hard count latency period (e.g., 2 clock cycles latency period as shown in FIG. 3B, 10 clock cycles, etc.). For instance, the hard count considers the maximum conceivable latency period of the peripheral memory device. That is, the latency is a maximum latency period that takes into consideration the maximum latencies of all sections of the peripheral device. In still another embodiment, the latency is an optimized latency count period. That is, the latency period is device or device section specific, and may vary depending on which peripheral device or which section of a peripheral device is delivering requested data, as will be further described in relation to FIG. 5. Latency periods may be determined by the peripheral device and stored in one or more latency registers, as will be further described in relation to FIG. 5. In still another embodiment, the latency period is innately known by the peripheral device, and does not refer to any latency counter and/or register for a latency period. That is, the peripheral device (e.g., the components and/or component circuitry managing the transfer of requested data to the output buffer) innately knows when requested data has been retrieved and loaded on the output buffer and is ready for delivery on the data bus, irrespective of any pre-determined latency period. As such, as soon as the peripheral data knows that data is available to be delivered, the peripheral device is configured to deliver the requested data over the data bus irrespective of any predetermined latency period.

As shown in the timing diagram 300B, the RDS signal is driven LOW immediately upon the assertion of the CS# signal, in one embodiment. In another embodiment, the RDS signal remains in the Hi-z state until the peripheral memory device drives the RDS signal HIGH along with the delivery of data. In still another embodiment, the RDS signal is driven HIGH immediately upon the assertion of the CS# signal.

In one embodiment, the read burst may retrieve a single byte of data or a series of bytes of data depending upon the configuration of the RPC host controller and the RPC peripheral device. In a multi-byte burst scenario, the CK, CK #, and RDS signals continue to toggle for each new data value.

Returning back to FIG. 3A, at 360, an ending of the read operation is indicated at the host device by asserting the chip select signal (CS#) to HIGH, while the first clock signal is LOW and the second clock signal is HIGH. For instance, as shown in the timing diagram 300B, the read transaction is terminated with the CS# signal returning HIGH, while the CK signal is asserted LOW, and the CK# signal is asserted HIGH. In other embodiment, other combinations are supports, such as, indicating a termination with CS# signal returning LOW, while the CK and CK# signals have opposite voltages (e.g., HIGH and LOW).

Figure 4A:
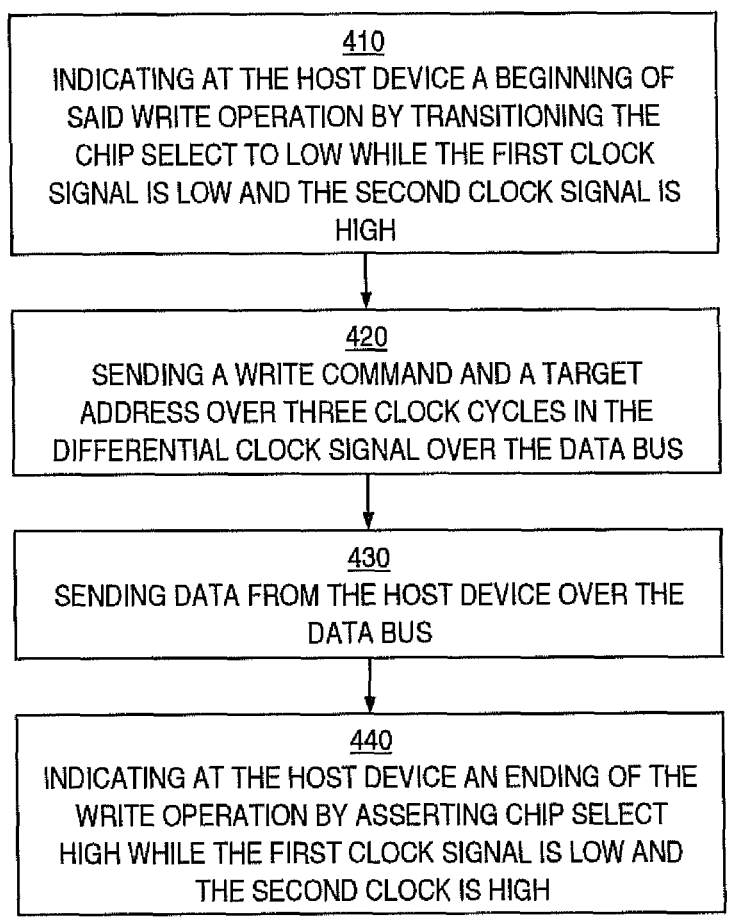
FIG. 4A is a timing diagram illustrating a write transaction over a memory bus interface that includes a read data strobe that indicates when valid data is present, in accordance with one embodiment of the present disclosure.
Figure 4B:
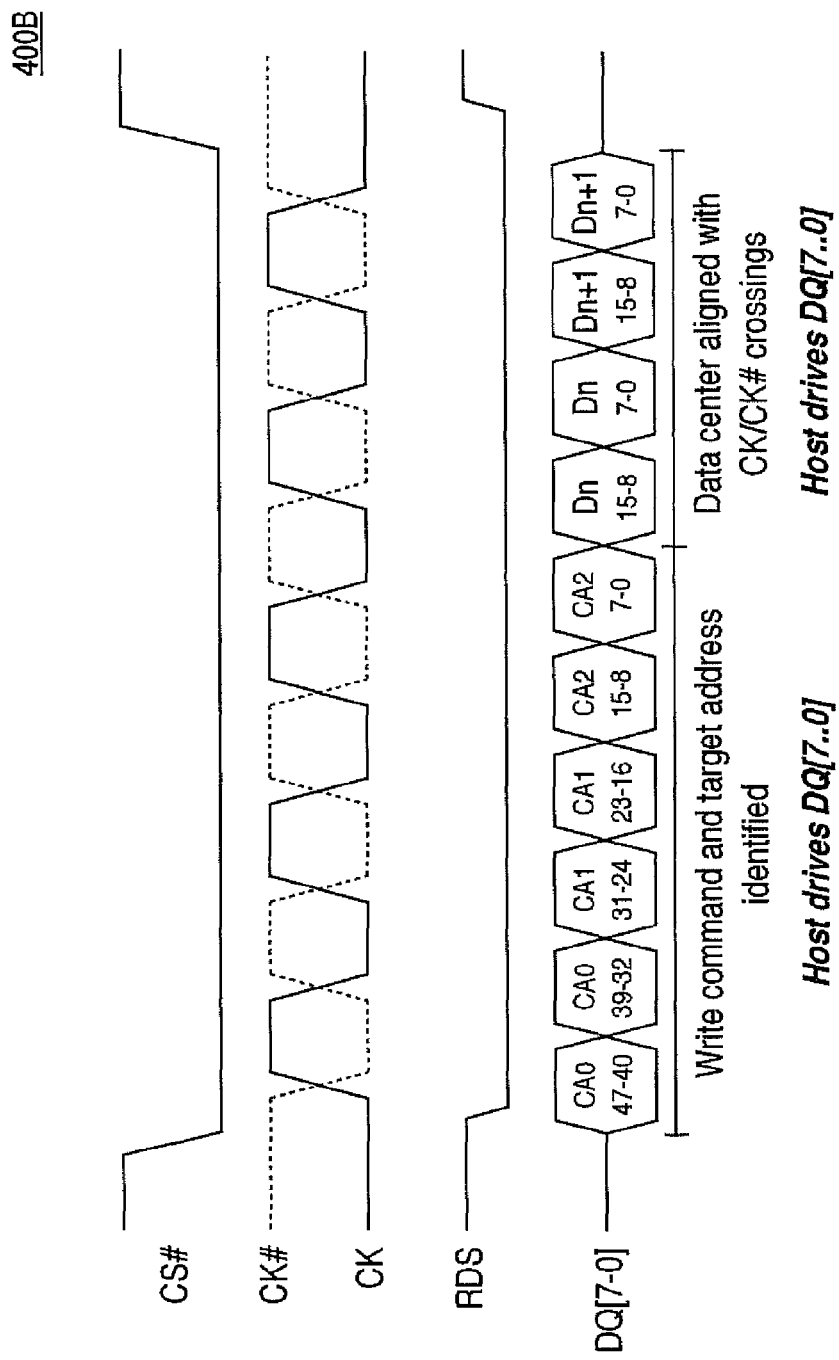
FIG. 4B is a timing diagram illustrating a write transaction over a memory bus interface that includes a read data strobe that indicates when valid data is present, in accordance with one embodiment of the present disclosure.

FIGS. 4A and 4B in combination illustrate a method for performing a write transaction using an RPC memory bus interface, such as, the interface 210 of FIG. 2A. In particular, FIG. 4A is a flow diagram 400A illustrating a method for performing a write transaction using a memory bus interface that facilitates communication between a host device and a memory device. FIG. 4B is a timing diagram 400B illustrating the implementation of the write transaction outlined in FIG. 4A, over the RPC memory bus interface, in accordance with one embodiment of the present disclosure. That is, the timing diagram 400B illustrates the bus signaling protocol used for a write transaction. Also, the use of a differential clock and the data strobe signal allows command, address, and data information to be transferred in a DDR fashion at higher clock rates.

At 410, at a host device, an indication that a write transaction is being conducted between the host device and the memory device is presented on a chip select line of the RPC interface. More specifically, a write transaction is initiated by the host device by asserting the chip select (CS#) signal (e.g., HIGH or LOW), while the clock signals have opposing voltages (e.g., HIGH and LOW). For illustration, as shown in timing diagram 400B, at the beginning of a write transaction, where the write command is delivered from the host device to the memory device, the CS# signal is asserted to LOW, while the first clock signal (CK) is asserted LOW, and the second clock signal (CK#) is HIGH. Also, throughout the duration of a write transaction, the chip select (CS#) signal is asserted LOW, in one embodiment.

At 420, write command and target address information are delivered from the host device over the data bus upon the first six clock transitions (e.g., three clock cycles). That is, six clock edges are used by the host to indicate to the peripheral memory device the transaction characteristics. In embodiments, one or more command and address (CAx) bits are delivered from the host device to the peripheral memory device to indicate the transaction characteristic, and may require one or more clock transitions to indicate the transaction characteristics. For purposes of illustration, as shown in timing diagram 400B, 48 CAx bits are presented during the initial portion of the write transaction over the RPC bus interface, as will be further described in relation to FIG. 7. In particular, the write transaction is identified with six byte wide values that are transferred from the host device to the peripheral device on the DQ[7-0] data bus in a DDR fashion during the first six clock edges. These CAx bits indicate that the current transaction is a write transaction. In addition, the information includes the target address in memory to which data is written at the peripheral device.

At 430, data is delivered by the host device over the data bus to the peripheral memory device. No latency is required in a write transaction. As shown in timing diagram 400B, the data (Dn . . . ) is center aligned with CK and CK# signal crossings, output by the host device, and written to the peripheral device.

As shown in the timing diagram 400B, the RDS signal is asserted (e.g., driven LOW or HIGH) immediately upon the assertion of the CS# signal, in one embodiment. In this case, the RDS signal remains in its asserted state throughout the duration of the write transaction. In another embodiment, the RDS signal remains in the Hi-z state throughout the write transaction.

In one embodiment, the write burst may retrieve a single byte of data or a series of bytes of data depending upon the configuration of the RPC host controller and the RPC peripheral device. In a multi-byte burst scenario, the CK and CK # signals continue to toggle for each new data value.

Returning back to FIG. 4A, at 440, an ending of the write operation is indicated at the host device by asserting the chip select signal (CS#) to HIGH, while the first clock signal is LOW and the second clock signal is HIGH. For instance, as shown in the timing diagram 400B, the write transaction is terminated with the CS# signal returning HIGH, while the CK signal is asserted LOW, and the CK# signal is asserted HIGH.

Figure 5:
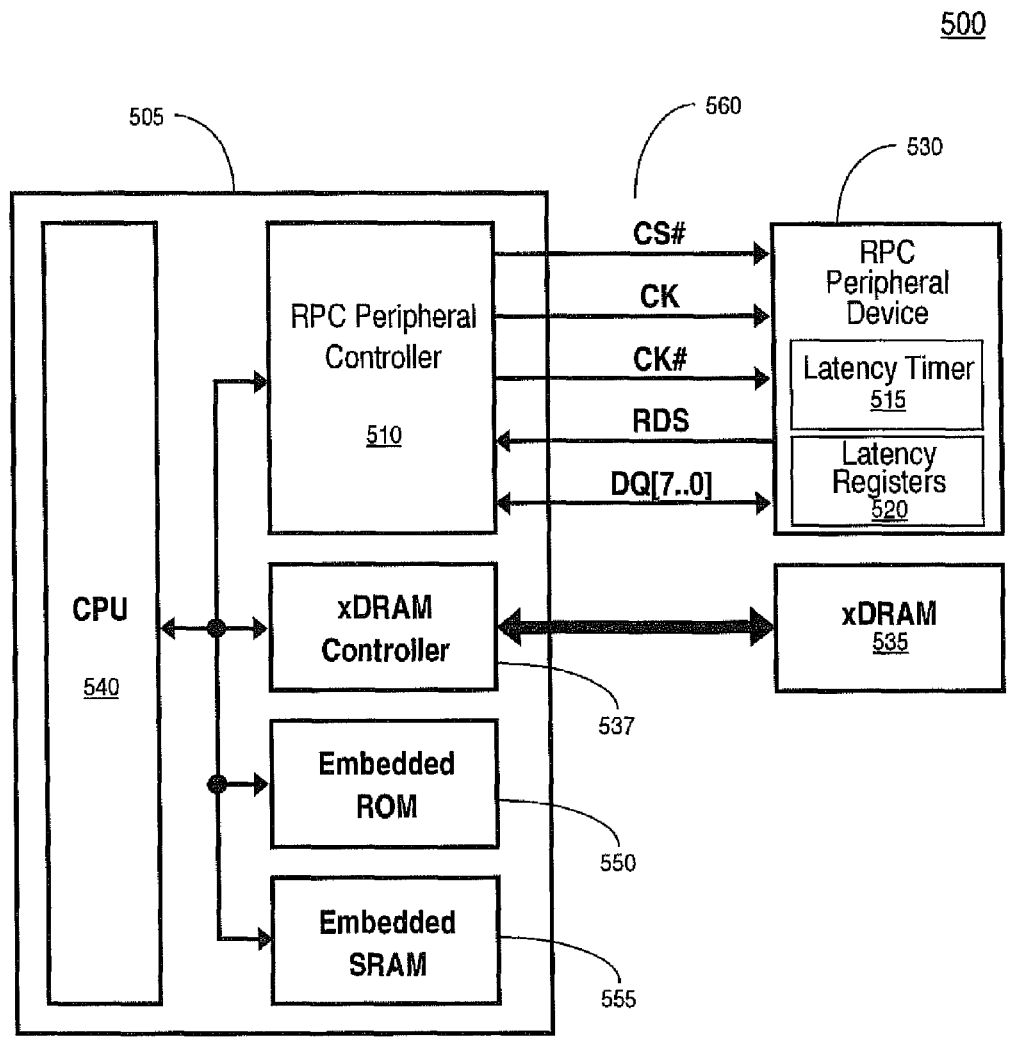
FIG. 5 is a block diagram of a peripheral controller of a peripheral device that is configured to determine latency characteristics of different target addresses within the peripheral device and to trigger a read data strobe that indicates when valid data is present on a data bus based on the latency characteristics, in accordance with one embodiment of the present disclosure.

FIG. 5 illustrates a peripheral controller that is able to use an RDS signal as a variable latency gating mechanism and as a data strobe to indicate when valid data is present, in accordance with one embodiment of the present disclosure. For instance, FIG. 5 is a block diagram of an RPC peripheral device 530 configured to implement variable latency read transactions over an RPC bus interface.

In particular, FIG. 5 is a block diagram of an RPC peripheral device 530 of a computing system 505 (e.g., a host device) that is configured to implement variable latency read transactions between the host device and a peripheral device over an RPC memory bus interface 560, in accordance with one embodiment of the present disclosure. In one embodiment, the peripheral device 530 is configured to start asserting the RDS signal as soon as data is ready to be output, rather than having to wait a fixed number of clock cycles to start the read data transfer. That is, the RDS signal is a used to indicate to the host device when each new data value is presented on the data bus (DQ[7 . . . 0]). Moreover, embodiments of the present invention eliminates the need for a dedicated READY or WAIT signal associated with legacy variable latency bus protocols to indicate when valid is available on the data bus.

As shown in FIG. 5, the computing system 505 (e.g., host device) includes an RPC peripheral interface 530 for coordinating communication over an RPC memory bus interface 560 with a peripheral device 530. The computing system 505 includes a central processing unit 540, and memory for storing embedded instructions, such as, in embedded random access memory (ROM) 550 and/or embedded static random access memory (SRAM) 555. Computing system 505 may also include an xDRAM controller 537 for controlling a memory device, such as, xDRAM 535.

More particularly, the RPC peripheral device 530 provides a variable latency feature that allows data read from different sections of a peripheral device to be immediately available. That is, the peripheral device 530 is able to determine and account for the varying initial access times of different sections of a peripheral device depending on the characteristics of the target address when making that data available on the data bus. That is, the peripheral device 530 is able to determine latency characteristics of different target addresses within the peripheral device and to trigger a read data strobe that indicates when valid data is present on a data bus based on the latency characteristics, in accordance with one embodiment of the present disclosure.

For instance, the time taken between when the target address is identified and data is presented is defined as the initial latency. Although the peripheral device may have many different internal latencies, depending upon the target address, the data is stalled internally until the determined latency has elapsed before placing the initial data value onto the data bus, in various embodiments.

As an example, flash memory devices have several different target address initial latency characteristics. Read operations can access different memory regions, to include status registers, SRAM buffers, the main Flash array, secondary Flash arrays and ROM arrays. All of these different memory regions have characteristic access times that vary significantly. The variable latency mechanism of the present disclosure allows better overall performance by allowing target data to be returned to the host in a reduced time.

More specifically, the peripheral device 530 is configured to perform a variable latency gating function as well as providing a data strobe function that indicates when valid data is present on the data bus. In particular, the peripheral device 530 will initiate the initial RDS transition edge (e.g., LOW to HIGH) as soon as data is ready to be presented, in one embodiment. For instance, the timing diagram 500B of FIG. 5B illustrates a read transaction over the RPC bus interface, wherein the initial transition of RDS is shown as a two clock initial latency. As such, embodiments of the present invention provide for the first rising edge of the RDS signal to transition earlier or later depending on the latency characteristics of target address.

As shown in FIG. 5, the peripheral device 530 includes a latency timer 515 and one or more latency registers 520. In one embodiment, the latency timer 515 is able to determine optimal initial latency timings independent of clock frequencies for different addresses, or different regions of memory. As such, higher clock rates use a larger latency count, while lower clock rates use a smaller latency count.

In one embodiment, the latency timer 515 is able to determine the worst case latency for the slowest target location in the peripheral device 530. That is, the latency register 520 is loaded with a latency count that is generalized for all memory locations. The latency count indicates the number of clock cycles required between when the target address is identified and when the initial data is output. As such, the peripheral device is configured to adjust when to start outputting data (and toggling the RDS signal) depending on the corresponding latency count for that target location and/or address, and the relative speed of the target address.

In another embodiment, the latency timer 515 is able to determine the latency for a specific target location, wherein the location is associated with one or more memory addresses. The determined latency can be stored in the latency register 520 for a corresponding target location. That is, the latency register 520 is loaded with one or more latency counts indicating a number of clock cycles required between when the target address is identified and when the initial data is output for corresponding target addresses. As such, the peripheral device has access to separate latency registers associated with each of the target address regions, wherein the different address regions have different initial access time characteristics. The latency registers 520 are loaded with characteristic values to optimize data throughput. In that manner, the peripheral device 530 is configured to determine latency characteristics of different target addresses and to trigger a read data strobe that indicates when valid data is present on a data bus based on the latency characteristics.

Figure 6:
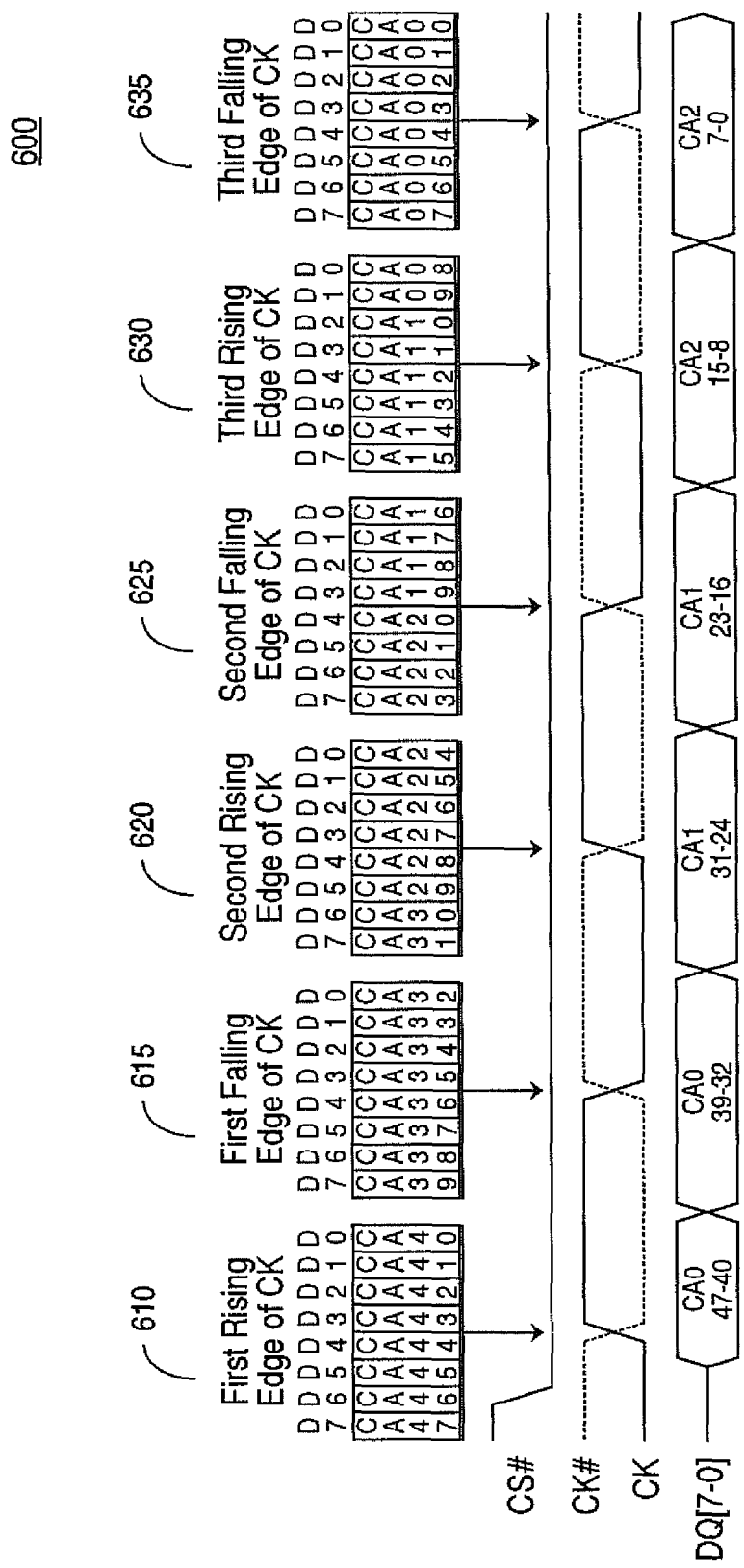
FIG. 6 is a diagram illustrating the bit placement during read or write transactions for a bus transaction over a memory bus interface that includes a read data strobe that indicates when valid data is present, in accordance with one embodiment of the present disclosure.

FIG. 6 is a bit diagram 600 illustrating the bit placement during read or write transactions for a bus transaction over a memory bus interface that includes a read data strobe that indicates when valid data is present, in accordance with one embodiment of the present disclosure. The bit placement shown in bit diagram 600 is representative of the information being transferred during the initial portions of read and write transactions performed over an RPC bus interface, all of which were previously discussed in FIGS. 1-5.

As shown in FIG. 6, bit assignments are described for the command and address information output by the host RPC controller in order to define the bus transaction to be performed by an RPC peripheral device. The command and address information is delivered on the data bus over the first six bytes that are transferred during the first six clock edges of an RPC transaction. In particular, 48 CAx bits are presented during the initial portion of an RPC bus transaction (e.g., read or write transaction). That is, 6 bytes of information is presented in FIG. 6. For instance, the sixth byte 610 includes bits 47-40 and is triggered on the first rising edge of the CK signal; the fifth byte 615 includes bits 39-32 and is triggered on the first falling edge of the CK signal; the fourth byte 620 includes bits 31-24 and is triggered on the second rising edge of the CK signal; the third byte 625 includes bits 23-16 and is triggered on the second falling edge of the CK signal; the second byte 630 includes bits 15-8 and is triggered on the third rising edge of the CK signal; and the first byte 635 includes bits 7-0 and is triggered on the third falling edge of the CK signal.

FIG. 7 is a table 700 indicating bit functionalities for a bus transaction over a memory bus interface that includes a read data strobe (RDS) signal that indicates when valid data is present, in accordance with one embodiment of the present disclosure. The bit functionalities of table 700 are representative of the bit assignments shown in FIG. 6, and describe the command and address information output by a host RPC controller in order to define the bus transaction to be performed by an RPC peripheral device.

More specifically, bit 47 (R/W#) identifies the transaction as a read or write transaction. For instance, when R/W#=1, this indicates a read transaction, whereas a R/W# value=0 indicates a write transaction. Also, bit 46 (Target) indicates where the target address is located, such as, in the main memory or register spaces. For instance, a Target value of 0 indicates a memory space, whereas a Target value of 1 indicates a register space. Bits 45-16 are reserved for future row address expansion.

Bits 37-16 (row Address) provide information for the row component of the target address. The row address bits identify which 32 bytes will be accessed from the memory array.

Bit 15 (Burst Type) indicates whether the burst of the transaction output is continuous or wrapped. For instance, a Burst Type value of 0 indicates a wrapped burst, whereas a value of 1 indicates a continuous burst. More particularly, the wrapped burst accesses the desired starting address in a burst length or row, continues to the end of the burst length and wraps around to the beginning of the burst length, until reaching the end of the 32 bytes of information for an array configured as a 32 byte row.

On the other hand, a continuous burst type again accesses the desired starting address and continues to the end of the continuous burst length. Then speculatively bringing the next group of data in the memory array into the output buffer to extend the current burst length. This speculative reading of the array continues until the termination of the read burst when chip select returns HIGH.

Bits 14-13 are reserved for byte enables used for RPC RAM devices. A Byte Enable value of 01 indicates that the bits 15-8 are masked; a Byte Enable value of 10 indicates that bits 7-0 are masked. The Byte Enable values are driven to 11 for an RPC Flash device. In addition, bits 12-4 are reserved for future column address expansion.

Bits 3-0 (Column Address) provide column address information. That is, Column Address bits provide the column component of the target address in the memory array. In one embodiment, the interface supports 8, 16, or 32 bit word interfaces. In that manner, both reads and writes are symmetrically balanced. In another embodiment, for a 16 bit interface, there is an indicator and/or bit (e.g., bit value 21) that indicates which byte or bytes (upper or lower or both) is or are valid.

Accordingly, embodiments of the present invention provide for a reduced pin count memory bus interface that provides for the implementation of a variable latency scheme over a memory bus interface that implements the use of a data strobe signal to indicate when valid data is delivered over the bus.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A memory bus interface, comprising:
   a chip select for delivering a chip select signal indicating when a peripheral device is activated, wherein said bus interface provides communication between a host device and said peripheral device;
   a differential clock pair for delivering a differential clock signal comprising a first clock signal and a second clock signal;
   a read data strobe for delivering a read data strobe signal from said peripheral device; and
   a data bus for delivering command, address, and data information, wherein said data bus comprises an 8 line wide data bus, and said memory bus interface comprises a 12 line interface.

2. The memory bus interface of claim 1, wherein said pair of differential clocks and said read data strobe enable transfer of data in a Double Data Rate (DDR) manner.

3. The memory bus interface of claim 1, wherein in a read transaction, crossings of said differential clock pair indicate delivery of said command and said address information, and transitions of said read data strobe signal indicate delivery of said data information.

4. The memory bus interface of claim 1, wherein in a write transaction, crossings of said differential clock pair indicate delivery of said command, address, and data information.

5. The memory bus interface of claim 1, wherein a functionality of said clock pair is single ended or differential.

6. The memory bus interface of claim 1, wherein a functionality of said read data strobe is single ended or differential.

7. The memory bus interface of claim 1, wherein said data bus operates as a single data rate bus or a double data rate bus.

8. A method for performing transactions using a memory bus interface, comprising:
   configuring a chip select to facilitate delivery of a chip select signal indicating when a peripheral device is activated, wherein said bus interface provides communication between a host device and said peripheral device;
   configuring a differential clock pair for delivering a first clock signal and a second clock signal to enable a differential clock signal;
   configuring a read data strobe for delivering a source synchronous output clock as a read data strobe signal from said peripheral device; and
   configuring a data bus for delivering command type, address, and data information;
   wherein said pair of differential clocks and said read data strobe enable transfer of data in a Double Data Rate (DDR) manner for a read transaction and a write transaction;
   performing said read transaction, wherein said performing comprises:
      initiating at said host device said read transaction by asserting said chip select signal while voltages for said first clock signal and said second clock signal are LOW and HIGH;
      sending a read type command and a target address over three clock cycles in said differential clock signal over said data bus, wherein said read type command indicates said transaction comprises a read type;
      indicating whether said read transaction is of a continuous burst type or a wrapped burst type;
      receiving data at said host device from said peripheral device over said data bus;
      receiving at said host device a read data strobe signal over said read data strobe; and
      retrieving at said host device said data beginning with a leading edge of said read data strobe signal, wherein said read data strobe signal comprises a source synchronous output clock.

9. The method of claim 8, further comprising:
   sending said read command and said target address over six clock transitions over said data bus; and
   waiting for a transition of said RDS signal before said retrieving said data.

10. The method of claim 8, further comprising;
    toggling said differential clock signal and said read data strobe signal for each data value in a multi-byte burst mode.

11. The method of claim 8, further comprising:
    terminating said read transaction by asserting said chip select signal to HIGH while said first clock signal is LOW and said second clock signal is HIGH.

12. The method of claim 8, further comprising:
    triggering said read data strobe signal at said peripheral device as soon as said data is ready.

13. A method for performing transactions using a memory bus interface, comprising:
configuring a chip select to facilitate delivery of a chip select signal indicating when a peripheral device is activated, wherein said bus interface provides communication between a host device and said peripheral device;
configuring a differential clock pair for delivering a first clock signal and a second clock signal to enable a differential clock signal;
configuring a read data strobe for delivering a source synchronous output clock as a read data strobe signal from said peripheral device; and
configuring a data bus for delivering command type, address, and data information;
wherein said pair of differential clocks and said read data strobe enable transfer of data in a Double Data Rate (DDR) manner for a read transaction and a write transaction;
performing said write transaction, where said performing comprises:
indicating at said host device a beginning of said write transaction by transitioning said chip select to LOW while said first clock signal is LOW and said second clock signal is HIGH;
sending a write type command and a target address over three clock cycles in said differential clock signal over said data bus, wherein said write type command indicates said transaction comprises a write type;
indicating whether said write transaction is of a continuous burst type or a wrapped burst type; and
sending data from said host device over said data bus.

14. The method of claim 13, further comprising:
center aligning said command, address and data information with signal crossings of said first and second clock signals.

15. The method of claim 13, further comprising:
toggling said differential clock signal for each data value in a multi-byte burst mode.

16. The method of claim 13, further comprising:
terminating said write transaction by asserting said chip select signal to HIGH while said first clock signal is LOW and said second clock signal is HIGH.

17. An apparatus, comprising:
a host device;
a memory device comprising a memory array operable for storing data;
a processor; and
a bus interface providing connectivity between said memory device and said host device, wherein said bus interface comprises:
a chip select for delivering a chip select signal indicating when a peripheral device is activated, wherein said bus interface provides communication between a host device and said peripheral device;
a differential clock pair for delivering a differential clock signal comprising a first clock signal and a second clock signal;
a read data strobe for delivering a read data strobe signal from said peripheral device; and
a data bus for delivering command, address, and data information, wherein said data bus comprises an 8 line wide data bus, and said memory bus interface comprises a 12 line interface.

18. The apparatus of claim 17, wherein said read data strobe indicates the delivery of read data information.

* * * * *